(12) United States Patent
Polster

(10) Patent No.: US 11,674,691 B2
(45) Date of Patent: Jun. 13, 2023

(54) METHODS AND SYSTEMS FOR HEAT TREATING A FOOD PRODUCT

(71) Applicant: Mary Noel Henderson, Appomattox, VA (US)

(72) Inventor: Louis S. Polster, Lynchburg, VA (US)

(73) Assignee: Mary Noel Henderson, Appomattox, VA (US)

( * ) Notice: Subject to any disclaimer, the term of this patent is extended or adjusted under 35 U.S.C. 154(b) by 717 days.

(21) Appl. No.: 16/688,336

(22) Filed: Nov. 19, 2019

(65) Prior Publication Data

US 2020/0080726 A1    Mar. 12, 2020

Related U.S. Application Data

(62) Division of application No. 15/915,669, filed on Mar. 8, 2018, now Pat. No. 10,520,199.

(Continued)

(51) Int. Cl.
| | |
|---|---|
| *F24C 7/08* | (2006.01) |
| *A23L 5/10* | (2016.01) |
| *A47J 37/01* | (2006.01) |
| *H05B 1/02* | (2006.01) |
| *A47J 27/00* | (2006.01) |
| *A47J 37/06* | (2006.01) |

(Continued)

(52) U.S. Cl.
CPC ............... *F24C 7/085* (2013.01); *A21B 1/40* (2013.01); *A23L 5/15* (2016.08); *A23L 5/17* (2016.08); *A23L 13/70* (2016.08); *A47J 27/004* (2013.01); *A47J 37/015* (2013.01); *A47J 37/0629* (2013.01); *A47J 37/0641* (2013.01); *F24C 7/087* (2013.01); *H05B 1/0263* (2013.01); *H05B 6/129* (2013.01); *A23V 2002/00* (2013.01)

(58) Field of Classification Search
CPC ..... A47J 37/0641; A47J 37/0629; A21B 1/40; F24C 7/087
See application file for complete search history.

(56) References Cited

U.S. PATENT DOCUMENTS

| | | |
|---|---|---|
| 400,978 A | 4/1889 | Watts |
| 3,128,362 A | 4/1964 | Clark et al. |

(Continued)

FOREIGN PATENT DOCUMENTS

| | | |
|---|---|---|
| DE | 20 2004 003408 U1 | 5/2004 |
| DE | 10 2005 003944 A1 | 11/2006 |

(Continued)

OTHER PUBLICATIONS

Sorour Alotaibi, "Temperature Controllability in Cross-Flow Heat Exchangers and Long Ducts," Jun. 2003.

(Continued)

*Primary Examiner* — Thien S Tran
(74) *Attorney, Agent, or Firm* — Oliff PLC

(57) ABSTRACT

Methods for heat treating food products include controlling a temperature of a heating element to a maximum temperature correlated to a desired temperature for the food product. A sensed temperature of the heating element may be used to control the maximum temperature. An oven includes a heating element and a temperature sensor configured to sense the temperature of the heating element, and a controller that limits the temperature of the heating element based on output from the temperature sensor.

19 Claims, 8 Drawing Sheets

Related U.S. Application Data

(60) Provisional application No. 62/468,737, filed on Mar. 8, 2017.

(51) Int. Cl.
*H05B 6/12* (2006.01)
*A21B 1/40* (2006.01)
*A23L 13/70* (2023.01)

(56) References Cited

U.S. PATENT DOCUMENTS

| | | |
|---|---|---|
| 3,392,268 A | 7/1968 | Bare et al. |
| 3,413,446 A | 11/1968 | Rogers |
| 3,521,030 A | 7/1970 | Maahs |
| 3,626,155 A | 12/1971 | Joeckel |
| 3,790,735 A | 2/1974 | Peters, Jr. |
| 3,800,123 A | 3/1974 | Maahs |
| 3,828,163 A | 8/1974 | Amagami et al. |
| 3,978,238 A | 8/1976 | Frey et al. |
| 4,008,996 A | 2/1977 | Wells |
| 4,036,995 A | 7/1977 | Koether et al. |
| 4,047,476 A | 9/1977 | Liebermann |
| 4,164,643 A | 8/1979 | Peart et al. |
| 4,210,675 A | 7/1980 | Liebermann |
| 4,224,862 A | 9/1980 | Liebermann |
| 4,245,613 A | 1/1981 | Wells et al. |
| 4,429,829 A | 2/1984 | Dutton |
| 4,459,467 A | 7/1984 | Bare et al. |
| 4,641,015 A | 2/1987 | Mayeur |
| 4,751,368 A | 6/1988 | Daifotes |
| 4,798,938 A | 1/1989 | Husslein et al. |
| 4,897,755 A | 1/1990 | Polster et al. |
| 5,015,827 A | 5/1991 | Kadwell et al. |
| 5,182,439 A | 1/1993 | Burkett et al. |
| 5,404,935 A | 4/1995 | Liebermann |
| 5,494,687 A | 2/1996 | Polster |
| 5,494,690 A | 2/1996 | Shelton |
| 5,548,101 A | 8/1996 | Lee |
| 5,872,351 A | 2/1999 | Sowerby |
| 5,916,617 A | 6/1999 | Polster |
| 5,961,866 A | 10/1999 | Hansen |
| 6,018,150 A | 1/2000 | Maher, Jr. |
| 6,455,094 B1 | 9/2002 | Ball et al. |
| 6,570,136 B1 | 5/2003 | Lockwood et al. |
| 6,586,712 B1 | 7/2003 | Mathews, Jr. et al. |
| 6,777,652 B2 | 8/2004 | Stockley |
| 6,864,468 B2 | 3/2005 | Kim et al. |
| 6,888,114 B2 | 5/2005 | Yagi |
| 6,940,049 B2 | 9/2005 | Harwell et al. |
| 6,943,321 B2 | 9/2005 | Carbone et al. |
| 6,943,324 B2 | 9/2005 | Ahuja |
| 6,949,729 B1 | 9/2005 | Ishikawa et al. |
| 7,030,350 B2 | 4/2006 | Kang |
| 7,038,179 B2 | 5/2006 | Kim et al. |
| 7,094,996 B2 | 8/2006 | Boehm |
| 7,378,617 B1 | 5/2008 | Brockman |
| D598,237 S | 8/2009 | Dawsey, III |
| 7,750,271 B2 | 7/2010 | Smith et al. |
| D629,639 S | 12/2010 | Fernandez et al. |
| 7,867,539 B2 | 1/2011 | Braeken |
| 8,071,146 B2 | 12/2011 | Erasmus et al. |
| 8,188,408 B2 | 5/2012 | Claesson et al. |
| 8,193,474 B2 | 6/2012 | Harris |
| 8,227,002 B2 | 7/2012 | Douglas et al. |
| 8,283,605 B2 | 10/2012 | Arione et al. |
| 8,455,798 B2 | 6/2013 | Akdag et al. |
| 8,569,667 B2 | 10/2013 | Erasmus et al. |
| 8,598,497 B2 | 12/2013 | Broders et al. |
| 8,609,168 B2 | 12/2013 | Ceravalls Pujol et al. |
| 8,674,270 B2 | 3/2014 | Anderson et al. |
| 8,734,877 B2 | 5/2014 | Homme et al. |
| 8,766,144 B2 | 7/2014 | McLoughlin et al. |
| 8,835,816 B2 | 9/2014 | McIntyre et al. |
| 8,929,724 B1* | 1/2015 | Mograbi ............... F24C 7/067 219/486 |
| 9,089,005 B2 | 7/2015 | Boedicker et al. |
| 9,476,598 B2 | 10/2016 | Paller |
| 9,494,322 B2 | 11/2016 | Luckhardt et al. |
| 9,518,745 B2 | 12/2016 | Boubeddi et al. |
| 9,554,421 B2 | 1/2017 | Meusburger |
| 9,572,361 B2 | 2/2017 | Bordin |
| 9,879,864 B2 | 1/2018 | Gutierrez et al. |
| 2006/0186108 A1 | 8/2006 | Kim et al. |
| 2008/0075823 A1* | 3/2008 | Jeon ............... F24C 15/327 99/325 |
| 2009/0272728 A1 | 11/2009 | Abbott |
| 2009/0288563 A1 | 11/2009 | Lim |
| 2010/0015313 A1 | 1/2010 | Harris |
| 2011/0132900 A1* | 6/2011 | Kinoshita ............ F24C 7/04 219/443.1 |
| 2011/0151072 A1* | 6/2011 | Anderson ........... F24C 7/082 99/325 |
| 2012/0123609 A1 | 5/2012 | Kuo |
| 2012/0148713 A1 | 6/2012 | Owensby et al. |
| 2013/0092682 A1 | 4/2013 | Mills et al. |
| 2013/0142923 A1 | 6/2013 | Torres et al. |
| 2014/0311473 A1* | 10/2014 | Hofmann ........... F24C 15/08 126/19 R |
| 2015/0272385 A1 | 10/2015 | Wang et al. |
| 2015/0297030 A1 | 10/2015 | Everett, Jr. et al. |
| 2016/0123660 A1 | 5/2016 | Peng |
| 2016/0123818 A1 | 5/2016 | Van Rens et al. |
| 2017/0016623 A1* | 1/2017 | Rabie ............... A47J 37/0629 |
| 2017/0089589 A1 | 3/2017 | Lamasanu et al. |
| 2017/0105248 A1 | 4/2017 | Dolinski et al. |
| 2019/0110630 A1 | 4/2019 | Kitabayashi et al. |
| 2019/0178501 A1* | 6/2019 | Baas ............... H05B 1/0213 |

FOREIGN PATENT DOCUMENTS

| | | | |
|---|---|---|---|
| DE | 102005003944 A1 * | 11/2006 | ........... F24C 7/087 |
| DE | 20 2007 012602 U1 | 11/2007 | |
| EP | 2908601 B1 | 11/2016 | |
| GB | 2 073 455 A | 10/1981 | |
| GB | 2 446 347 A | 8/2008 | |
| GB | 2530373 B | 5/2017 | |
| JP | 2010286206 A * | 12/2010 | |
| WO | 97/02751 A1 | 1/1997 | |
| WO | 98/28945 A1 | 7/1998 | |
| WO | 2007/124008 A2 | 11/2007 | |
| WO | 2008/099667 A1 | 8/2008 | |
| WO | 2012/160750 A1 | 11/2012 | |
| WO | 2014/093476 A1 | 6/2014 | |
| WO | DM/086 691 | 5/2015 | |
| WO | DM/096 273 | 9/2016 | |
| WO | 2018/148363 A1 | 8/2018 | |

OTHER PUBLICATIONS

Zoran K. Morvay et al., "Toolbox 11 Heat Exchanger Operating Point Determination," Applied Industrial Energy and Environmental Management.
W.J. Stadelman et al., "Pasteurizaton of Eggs in the Shell," 1996, Poultry Science 75:1122-1125.
Bread baking temperature—Google Search, <https://www.google.com/?gws_rd=ssl>, Jan. 29, 2017, 1 page.
Bread baking temperature internal—Google Search, <https://www.google.com/?gws_rd=ssl>, Jan. 29, 2017, 1 page.
Baking Temperatures and Times—DeGraeve.com, <http://www.degraeve.com/reference/cake-baking-temperatures-times.php>, Jan. 29, 2017, 2 pages.
What's so Special About 350° F.?—We've Got Chemistry/Kitchn, <http://www.thekitchn.com/whats-so-special-about-350-f-food-science-217960>, Apr. 17, 2015, 6 pages.
Internal Temperature Cooking Chart, What's Cooking America, <https://whatscookingamerica.net/Information/MeatTemperatureChart.htm>, 22 pages.
Alto-Shaam Cook, Hold, Smoke Oven Manual Control, 44 pages, Oct. 2016.
Alto-Shaam Hot Holding Rotisserie Companion, 32 pages, Sep. 2013.

(56) References Cited

OTHER PUBLICATIONS

What is Halo Heat?—Foodservice Equipment & Supplies, <http://www.fesmag.com/alto-shaam/13756-what-is-halo-heat, Aug. 25, 2016, 3 pages.
How to Understand Oven Temperature—Bon Appetit, <http://www.bonappetit.com/test-kitchen/cooking-tips/article/oven-temperature-undercooked-cake>, Aug. 17, 2017, 10 pages.
Thermal Secrets to Oven Calibration—ThermoWorks, <http://blog2.thermoworks.eom/2014/11/thermal-secrets-oven-calibration/>, 9 pages, Nov. 14, 2014.
How to Dry-Age Beef at Home—Fine Cooking, <http://www.finecooking.com/article/how-to-dry-age-beef-at-home>, Mar. 5, 2018, 3 pages.
Oven-Heating Elements, <http://www.tpub.com/ceb/94.htm>, Mar. 7, 2018, 3 pages.
C.K. Hank et al., "The Effect of Shell Egg Pasteurization on the Protein Quality of Albumen," 2001, Poultry Science 80: 821-824.
Breville, the Smart Oven Pro Instruction Book, 2014.
Cooking with Thermodyne: Fluid Shelf Precision Heat Transfer System. "Cooking and Holding Guidelines". <http://tdyne.com/uploads/media/Product_Downloads/C_and_H_Guidelines_2016.pdf> Mar. 8, 2018, 23 pages.
May 29, 2018 International Search Report issued in International Application No. PCT/US2018/021538.
May 29, 2018 Written Opinion issued in International Application No. PCT/US2018/021538.
Aug. 16, 2018 Office Action issued in U.S. Appl. No. 15/915,669.
Epicurious, NPL, published Nov. 3, 2015, https://www.epicurious.com/expert-advice/strategies-to-cook-thanksgiving-meal-with-one-article (Year: 2015).
Jared Stone NPL, published Jun. 19, 2015, http://www.jaredstonewrites.eom/latest/2015/6/17/do-this-the-reverse-sear (Year: 2015).
Lifehacker NPL, published Jun. 29, 2012, https://lifehacker.com/5922358/how-to-decide-baking-temperature-when-a-recipe-doesnt-mention-it (Year: 2012).
Pastry Affair NPL, published Jan. 17, 2012, https://www.pastryaffair.com/blog/2012/1/17/tuesday-tip-freezing-cookie-dough.html (Year: 2012).
Serious Eats NPL, published Oct. 12, 2016, https://web.archive.org/web/20161012032545/https://www.seriouseats.com/2016/10/how-to-take-meat-temperature-thermometer-cooking-doneness.html (Year: 2016).
Slow Goes It NPL, published Jan. 9, 2008, http://www.washingtonpost.com/wp-dyn/content/article/2008/01/08/AR2008010801295.html?sid=ST2008010801972 (Year: 2008).
Sugar Cookies NPL, published Nov. 26, 2016, https://onelittleproject.com/perfect-sugar-cookies/ (Year: 2016).
Sep. 19, 2018 Office Action Issued in U.S. Appl. No. 15/915,669.
Jun. 10, 2019 Office Action issued in U.S. Appl. No. 15/915,669.
Ladypups NPL, published Sep. 30, 2015, http://ladyandpups.com/2015/09/30/how-to-easily-sous-vide-in-oven-with-or-without-water/ (Year: 2015).
Kitchn NPL, published Apr. 19, 2015, https://web.archive.org/web/20150419183821/https://www.thekitchn.com/whats-so-special-about-350-f-food-science-217960 (Year: 2015).
Modernist NPL, published Mar. 20, 2013, https://modernistcuisine.com/2013/03/the-maillard-reaction/ (Year: 2013).
Louis Polster, "Turkey a la Polster [and] Meat Doneness Temperatures," communication to family and friends, Dec. 2015.
Feb. 19, 2019 Office Action issued in U.S. Appl. No. 15/915,669.
Sep. 3, 2019 Notice of Allowance issued in U.S. Appl. No. 15/915,669.
Oct. 8, 2021 Office Action issued in Indian Patent Application No. 201947040604.

* cited by examiner

METHODS AND SYSTEMS FOR HEAT TREATING A FOOD PRODUCT

This is a divisional of application Ser. No. 15/915,669 filed Mar. 8, 2018, which is a non-provisional of application No. 62/468,737 filed Mar. 8, 2017. The entire disclosures of the prior applications are hereby incorporated by reference herein in their entirety.

BACKGROUND

Variances in heating among and within ovens can result in less than desirable end food products. For example, a food product may be overcooked in some portions, while undercooked in other portions. This is particularly the case when cooking food products of varying thicknesses or sizes. Similarly, adjacent food products in an oven may be overcooked or undercooked. Moreover, it is very difficult to evenly cook a food product that is placed in a conventional oven for cooking directly from a frozen state, especially when the product is asymmetrical, thus requiring additional time and expense to initially thaw the food product.

Conventional ovens that heat a food product by thermal transfer of heat from heated air in the oven to the food product (i.e., by natural or forced air convection) often produce less than desirable characteristics of the end product, such as unevenly cooked, undercooked or overcooked meat, and unevenly cooked, undercooked or burned bakery goods. In conventional ovens, cooking is generally performed by heating air to a desired temperature by way of on/off thermostatic control of a much hotter heating element. Conventional proportionally controlled heating ovens work in a similar manner, but the heating elements are heated proportionally to the load in the oven—e.g., the lower the air and/or food temperature in the oven, the hotter the heating element, and vice versa. However, in all such ovens, temperature differences in the air in the oven can be substantial. The less than optimal uniformity of the heating of the air in conventional ovens can affect the resulting cooked food product. Thus, unless an operator is present to monitor and interrupt or modify the cooking process, the quality of the end food product may be adversely affected. Furthermore, monitoring itself may adversely affect the cooking process or food outcome. The normal practice of opening the oven door during cooking, such as to monitor or stir food or to turn a tray to try to even out browning, slows the cooking or baking process by reducing the temperature in the oven, often by 100° F. or more. Then the timing can easily get away from the oven user. In both on/off and proportionally controlled ovens, this also results in significant increases of heating element temperature. The heating element may become red hot, causing burning of many foods and a spike in oven temperature, and may result in charring of the food and sometimes even smoke damage to the kitchen.

Another aspect of temperature-controlled treatment of meats involves dry aging of meats such as beef, lamb, pork, fowl, game and other meats. For example, most fresh beef is aged (tenderized) for at least a few days, and up to several weeks, to allow enzymes naturally present in the meat to break down muscle tissue, resulting in improved texture and flavor. In these processes, the meat is maintained at a low temperature (e.g., below 40° F., often around 28° F.) to reduce or prevent the growth of bacteria in or on the meat during the aging (tenderizing) process. This process is generally applied to whole carcasses, primal muscles or roasts. Such processes are generally not applied to already-cut steaks or filets.

SUMMARY

Methods and ovens for heat treating food products are provided. Embodiments of methods include cooking and/or dry aging the food product by thermal transfer of heat to the food product from the air in the oven that contacts a surface of the food product (or a cooking utensil such as a pot or pan containing the food product) by heating that air with a heating element.

In embodiments, a food product is cooked in an oven using an electrically energized heating element that is controlled such that it does not exceed a maximum temperature that is defined as the sum of (a) a predetermined temperature selected from the group consisting of (i) for a pastry food product, a temperature X that is less than a burn temperature of a surface of the food product and (ii) for a meat or fish food product, a temperature Y that is a desired internal doneness temperature of the food product, plus (b) a predetermined droop offset determined by the characteristics of the oven.

In embodiments, a maximum temperature of the heating element is controlled using a sensed temperature of the heating element while heat treating the food product.

In embodiments, a meat product is tenderized, or aged, by maintaining the meat product in an oven with a heating element for two or more hours while a temperature of the heating element is controlled to remain between limits (a) and (b), wherein limit (a) is a temperature above 100° F. at which surface bacteria on the meat product do not increase, plus a predetermined droop offset, and limit (b) is a higher temperature at which most tenderizing enzymes in the meat product are inactivated, plus the droop offset.

In embodiments, an oven includes a housing defining an interior cooking space in which a food product may be heat treated primarily by thermal transfer of heat from heated air in the oven to the food product, and at least one electrically energizable heating element configured to be exposed to and heat the air. The oven includes a temperature sensor configured to sense a temperature of the heating element and a controller configured to impose an upper limit on the temperature of the associated heating element and respond to output from the temperature sensor such that the heating element temperature does not exceed the upper limit.

BRIEF DESCRIPTION OF THE DRAWINGS

Various embodiments of methods and systems described herein will be addressed in connection with the Figures, in which.

DETAILED DESCRIPTION OF EMBODIMENTS

Figure 1:
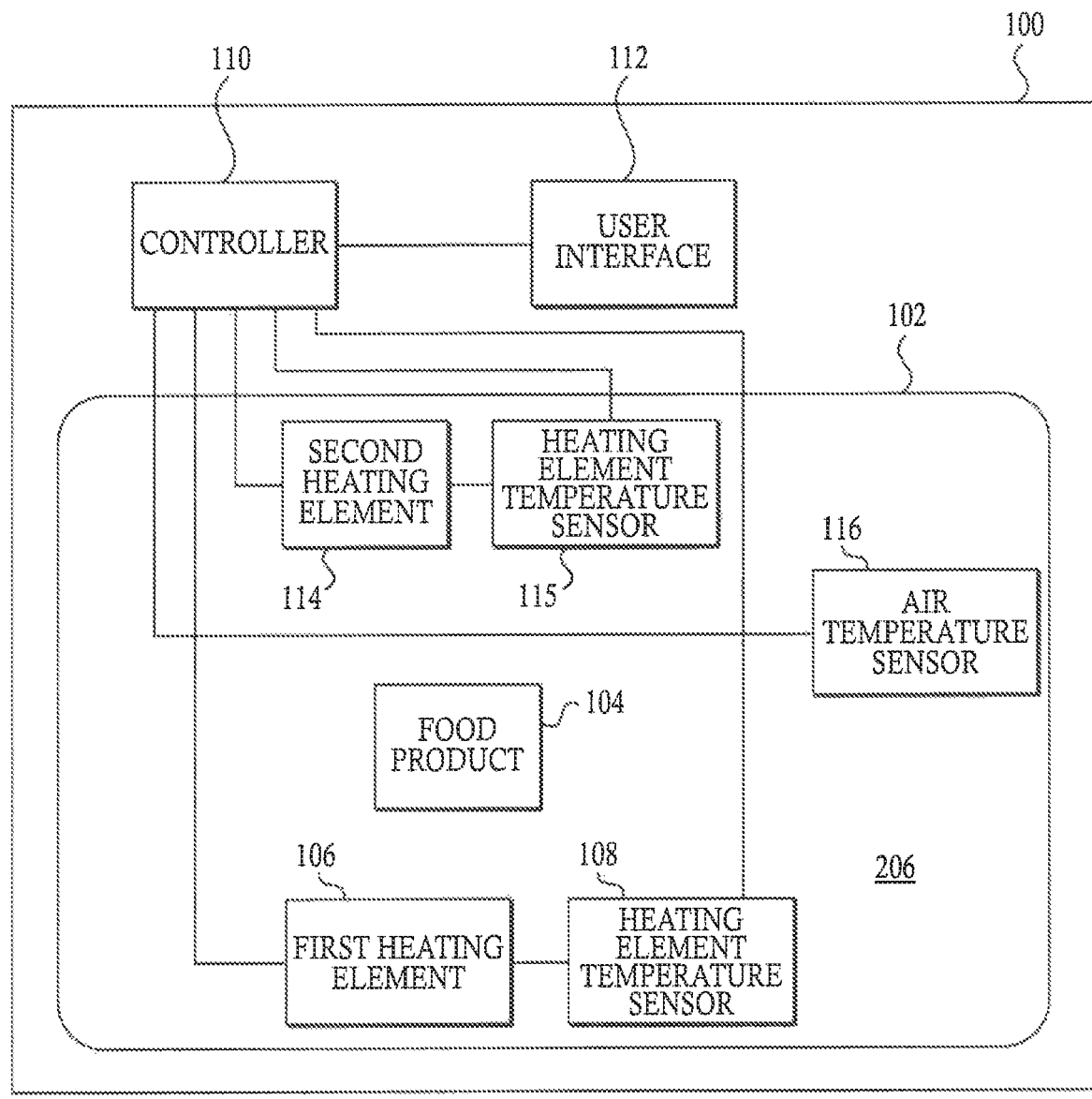
FIG. 1 is a block diagram of an oven in accordance with an embodiment.

The exemplary embodiments described herein provide detail for illustrative purposes and are subject to many variations in structure and design. It should be appreciated, however, that the invention is not limited to a particularly disclosed embodiment shown or described. Various combinations of disclosed elements and omissions and substitutions of equivalent elements are contemplated as circumstances may suggest or render expedient.

The phraseology and terminology used herein is for the purpose of description and should not be regarded as limiting. The terms "a," "an," and "the" herein do not denote a limitation of quantity, but rather denote the presence of at least one of the referenced object. It will be further understood that the terms "comprises" and/or "comprising," when used herein, specify the presence of stated features, integers, steps, operations, elements, and/or components, but do not preclude the presence or addition of one or more additional features, integers, steps, operations, elements, components, and/or groups thereof.

Various embodiments include methods for cooking a food product from a not-fully-cooked state to a fully-cooked state, including but not limited to pastry products, meat, fish, fruits and/or vegetables. (As used herein, unless required otherwise by the context, "fish" includes shellfish.) Exemplary methods can cook a food product in one or more heat treating modes (e.g., baking and roasting). As used herein, a pastry product is a food product formed from a dough comprising flour and a liquid such as water or milk, optionally with yeast, shortening, sugar, egg, and/or other ingredients, used as a base, body and/or covering of the food product. Examples include, but are not limited to, breads, biscuits, cakes, cookies, doughnuts, croissants, crullers, tarts, pies (including, for example, fruit, nut, meat, fish, vegetable and/or cheese pies with top and/or bottom pie crusts), pasties, and food products "en croute."

In embodiments, a food product is cooked from a not-fully-cooked state to a fully-cooked state in an oven using an electrically energized heating element whose temperature is controlled not to exceed a maximum temperature defined as the sum of:

(a) a predetermined temperature selected from the group consisting of:
 (i) for a pastry food product, a temperature X that is less than a burn temperature of a surface of the food product, and
 (ii) for a meat or fish food product, a temperature Y that is a desired internal doneness temperature of the food product, plus
(b) a predetermined droop offset.

In embodiments, a meat product is heat treated (e.g., tenderized, or aged) by maintaining the meat product in an oven with a heating element for two or more hours, such as two, three, four, six, eight, ten, twelve, eighteen, twenty-four or thirty-six hours, while a temperature of the heating element is controlled to remain between limits (a) and (b), wherein limit (a) is a temperature above 100° F., such as above 115° F. or 120° F., or between 135 or 138 and 140° F., at which surface bacteria on the meat product do not increase, plus a predetermined droop offset, and limit (b) is a higher temperature at which most tenderizing enzymes in the meat product are inactivated, such as about 140-145° F., plus the droop offset.

For example, in embodiments, feedback from a temperature sensor that senses temperature of a heating element can be used to control a maximum temperature of the heating element during the heat treating process. While these temperatures are well below usual heating element temperatures in conventional ovens, surprisingly the cooking times using methods of the invention may generally be the same as or similar to cooking times used in conventional oven recipes, although longer cooking times may be used for convenience or certain food products and food product characteristics. Time is also saved by the fact that thawing of frozen food products before putting them in the oven is not necessary when using methods/ovens of at least some embodiments of the invention (e.g., "FROZEN-TO-FINISHED™" technology).

In addition, cooking is much more uniform within one oven, often eliminating the need to open the door and turn a tray of product, or between various ovens, utilizing embodiments of methods and ovens described herein with accurate heating element temperature control. This also facilitates use of the same cooking recipe for all such ovens, making the need to "learn" a new oven unnecessary.

In embodiments in which such heating element temperature control is applied to dry aging, the temperature is well above normal aging temperatures. Aging is vastly accelerated due to the fact that aging (both tenderizing and flavor enhancing) enzymatic processes are much more rapid at higher temperatures. For example, the speed of such processes is generally doubled by each 10° C. (about 18° F.) rise in temperature. Thus, for example, an aging process that would take three weeks at a normal temperature of about 28° F. will take less than eight hours at about 140° F. Aging of meat products can thus be accomplished in a very short time—e.g., between breakfast and dinner—by implementing methods of this aspect of the invention, allowing consumers or food retailers to purchase cheaper, tougher cuts of meat and tenderize them on demand without waiting days or weeks for the tenderization to be completed. In embodiments, the aging temperatures are maintained for at least two hours, preferably at least six or eight hours, or longer (e.g., 12, 18, 24 or 36 hours).

By practicing various embodiments, characteristics of the food products may be established and/or maintained. For example, cooking in accordance with one or more embodiments can control the external surface and/or internal doneness of a food product to produce and maintain (without substantial degradation that would have an adverse effect), functionality, taste, texture, and/or color (e.g., brownness) of the product over time, with substantial flexibility in the cooking time of the product. The food product may, for example, be heat treated to a desired level of doneness without any portion of the food product reaching a temperature that would produce a burned surface (e.g., providing a crispy, but not burnt, outside surface of a cookie, or an evenly done but not burnt pie crust over, under or around a filling). In addition or alternatively, heat treatment in accordance with one or more embodiments can control the internal doneness of the food product to have a doneness gradient in the food product (e.g., from medium well done near the surface to medium rare at the center of a cut of meat), or to be uniform substantially throughout the food product (e.g., medium rare from edge to edge of a roast) by continuing to heat treat the food product until a uniform internal temperature is reached in the food product. For example, a roast may be cooked to a uniform "medium-rare" doneness from edge to edge, with only the surface being browned due, e.g., to the Maillard and/or other reactions. Using dry aging embodiments of methods of the invention, meat can be aged and cooked at temperatures of the heating elements that accomplish both aging and cooking, or aged at a lower temperature and then cooked.

In embodiments, the heat treating is performed with minimal venting of air from the oven, for instance with a nominally unvented oven or by closing down the vent(s) of a vented oven (subject to enough venting to provide pressure relief) during heating-element-temperature-limited heat treatment. This can help increase the temperature uniformity within the oven, reduce waste of energy, and reduce cooking and/or aging times. Cooking with a closed down vent or slight venting in combination with placing water in the oven before or during cooking can be particularly useful in reducing cooking times by providing superheated steam that facilitates heat transfer in the cooking space of the oven.

By practicing one or more embodiments, a food product in a not-fully-cooked state at any temperature, including but not limited to starting as frozen, refrigerated or room temperature, raw or partially cooked, may be cooked to a fully-cooked state by controlling the temperature of the heating element to heat treat the entire food product to a desired level of doneness, which may be the same or different throughout the inside of the food product (based on a cook time) as described above. For example, at a given oven temperature, some products have different heating requirements in different portions. For example, a pie with a flanged (e.g., fluted) crust may need to stay in the oven longer than necessary to cook the crust in order to thaw and fully cook the filling. For example, the crust may be fully cooked when it reaches 350° F., while the filling may take much longer (possibly including thawing time) to reach a desired temperature of 200° F. With methods of the invention, the oven can be set at 350° F. (with the heating element controlled, for example, not to exceed about 350° F. plus droop offset), and the pie may be left in the oven until the filling reaches the desired temperature. In such a "safe" mode, even a thin flange of the crust can be maintained at a cooked but not burnt temperature long after it is fully cooked, allowing completion of the thawing and/or cooking of the filling without burning of the crust. Similarly, while the center of a frozen roast or fish will take much longer than the surface to cook to a desired temperature, the portions of the food product nearer the surface will not exceed a pre-set doneness level. Thus, the temperature of the initial food product and asymmetry of the food product do not adversely affect the outcome of the heat treatment. Separate thawing times and actions are not required. For example, with an asymmetric food product that is to be brought to a uniform temperature, smaller or thinner parts of the food product can be kept at the desired degree of doneness while larger or thicker parts of the food product continue to thaw and cook to that level of doneness. For example, a fish filet such as a salmon filet with a thin section and a thick section, or a roast with a large-diameter end and a small diameter end, can be cooked from frozen or another temperature until the thicker or larger section is fully cooked, without overcooking the thinner or smaller section.

As used herein, "fully-cooked state" generally entails a state of cooking at which the product could normally be intended to be consumed, but does not preclude further heat treatment of the food product. For example, a fully-cooked meringue pie may be subjected to brief broiling to singe the tops of the meringue, or a fully-cooked piece of meat or fish may be additionally grilled to add grill flavoring and/or markings, or further cooked to a different greater doneness level—e.g., fully-cooked meat at a state of rare doneness could subsequently be further cooked to a state of medium-rare, medium, medium-well or well doneness. "Not-fully-cooked state" as used herein could encompass, for example, raw or raised-but-not-fully-cooked dough, meat or fish, or a previously partially-cooked product such as rare meat as discussed above, or a pie in which filling materials have previously been at least partially cooked.

In embodiments, control of heat treating may include an initial process of preheating air in the oven to a desired heat treating temperature. In embodiments, a food product is primarily heated by thermal transfer of heat to the food product from air in the oven by heating the air with an electrically energized heating element that is exposed to that air—e.g., by natural or forced air convection. In embodiments, preheating of the oven and/or air in the oven is performed with a heating element at a higher temperature than the limited temperature described above. This may be accomplished with either the same or a different heating element, and may be monitored and controlled based on feedback from a temperature sensor that senses temperature of the oven air. Preheating may have some effect on a surface of a food product that is present in the oven during preheating, depending on the susceptibility of the food product to a higher temperature at the beginning of the heat treatment. However, in much cooking, oven preheating has almost no effect on the surface of the food product due to the initial low temperature and high moisture content of the food product. For food products that may be adversely affected by preheating times and temperatures, the preheating is preferably partially or fully completed before the food product is placed in the oven. For food products that are not adversely affected by preheating times and temperatures, the preheating may be begun and/or completed before or after the food product is placed in the oven.

During, and preferably throughout, cooking after any preheating, exemplary methods control a maximum heating element temperature not to exceed the sum of an outside surface burn temperature of the food product plus a predetermined droop offset. "Droop offset" refers to an inherent loss of heat energy involved in the transfer of heat from a heating element to and through air, and is characteristic of oven design. In general, ovens of the same design will have the same or very similar droop offset. Particularly in combination with the precise heat element temperature control available in embodiments of sensors and controllers of the current disclosure, this allows for improved uniformity of cooking conditions among ovens of the same model. In embodiments, a droop offset may be as high as 30° F. or more, such as 25-30° F. in a toaster oven, or 5, 10 or 15° F. in other ovens such as home and commercial ovens. Droop offset may be at the higher levels in, for example, vented ovens like toaster oven or other ovens with the vent open and at the lower levels in minimally vented and well insulated ovens. In addition, droop offset correlates to heat treating temperatures. Thus, for example, the droop offset may be much lower, e.g., below 5° F., at aging temperatures or cooking temperatures for some meat products.

Temperatures useful in embodiments include the entire temperature range of the oven, and may be based on the food product and temperature called for by the recipe being followed. For pastry products, useful temperatures include, for example, 225° F., 250° F., 275° F., 300° F., 325° F., 350°

F., 375° F., 400° F., or 425° F. (plus droop offset). Most pastry products will burn above 450° F., and most sugary pastry products will burn at and above 400° F. Burning the food product in various embodiments means heat treating the food product to a temperature ("burn temperature") at which an outside surface of the food product has a level of doneness or darkness that is an undesirable, such as cooked to a burnt flavor, ashy texture, and/or undesired dark brown or black color. As an example, sugary pastry products such as cookies, cakes and dessert pies are generally considered too dark, and thus burnt, at a surface temperature of 400° or above, such as 450° F. Low sugar (e.g., no-sugar-added) pastry products such as some biscuits or meat/vegetable pie crusts may be cooked at higher temperatures such as 400 or 425° F. without burning. In embodiments, a signal such as a "NO BURN™" light will go on for a temperature setting of 300-375° F. (plus droop offset), and will go off above a set temperature limit such as 375° F. (plus droop offset) to indicate that temperature control in accordance with the described methods is being implemented in a range that will generally prevent any burning of pastry products.

For dry aging meat products, the temperatures of the heating elements and the aging time will depend on the meat being treated (e.g., age of the animal, grade of the meat, such as corn-fed versus grass-fed beef, type of meat such as beef versus pork, etc.), the size of the meat product, and the desired finishing temperature. For example, grass-fed beef that is to be finished at medium rare or more may be aged at heating element temperatures of 135-140° F., such as 138-140° F., (plus droop offset) for six to twenty-four hours or at about 120-125° F. for twelve to thirty-six hours, whereas corn-fed beef can be aged at such temperatures for shorter periods of time, and beef that is to be finished in a more rare state should be aged at the lower temperatures. Such times and temperatures will work similarly for pork and other meats that are to be cooked to higher temperatures. Aging embodiments can be applied to whole muscle meat, or to smaller pieces of meat such as roasts and steaks (e.g., steaks cut to less than about 1, 2 or 3 inches thick. It has also surprisingly been found that taste and texture are significantly improved by aging at 130-138° F., such as 134-138° F. or 134 to 136° F., even compared to aging at 140° F. (heating element temperatures plus droop offset).

Various embodiments allow for the control of the temperature of the heating element based on, for example, either a pre-set or user designated surface temperature of the food product and/or degree of doneness for the food product. For example, the oven may include a user interface with an input structure (e.g., touch pad, button or dial) that is simply labeled "bake" or "NO BURN™" or "Golden Brown" as an indicator that baking is being done and a method as described herein is being implemented to avoid burning of the food product. In such embodiments, the oven target temperature (e.g., recipe temperature) and heating element limit (before accounting for droop offset) may be, for example, preset at 350° F. However, some users may prefer a product that is lighter or darker brown than provided by a 350° F. surface temperature. Thus the user interface may further include input structures that allow adjustment of the heating element temperature, for example in 10° F. or 25° F. increments, preferably up (or down) to a predetermined limit such as, for example, two increments, a total of 50° F., or not above 400° F. or 425° F. Such input structures (e.g., buttons, touch pads or dials), could, for example be labeled "+" and "−" or "Lighter" and "Darker" for simplicity of understanding. In embodiments, however, the actual temperature setting change may or may not be displayed to the user.

In cooking of meats (including but not limited to red meat and poultry meat) and fish (including but not limited to fin fish and shellfish), various embodiments achieve even doneness regardless of thickness variations and without any exterior surface burning or overcooking as discussed above.

In embodiments, a user can set a doneness of the product using a user interface that includes user input structures that identify traditional doneness levels (e.g., rare, medium rare, medium, medium-well, or well done). In such embodiments, the heating element maximum temperature may be set at a droop offset plus the temperature at which the meat or fish of interest exhibits such characteristics, for example using USDA guidelines. The temperature values may be stored in a table, such as within a memory of a controller (or in a database) of the oven and used to set a limit on the heating element temperature.

For example, in some embodiments, the preset product temperatures for different levels of doneness for different food products may be established as follows, generally within ±2-5° F.:

Beef—Rare 130° F.;
Beef—Medium-Rare 140° F.;
Beef—Medium 150° F.;
Beef—Medium-Well 155° F.;
Beef—Well 160° F.;
Beef—Dry and tough above 160° F.;
Beef—Stewed, Pot Roasted, "boiled" or "steamed" (beef in water with at least some salt) around 190° F.;
Poultry (White meat)—Done and juicy 158-160° F.;
Poultry (Dark meat)—Done and juicy 168-170° F.;
Pork Loin—Done and juicy 160° F.;
Pork Shoulder—Done and juicy 168 to 170° F.;
Lamb—same as beef and other red meats;
Fish (not Tuna, Salmon, Swordfish and Shark)—Done, moist and flaky 160° F.;
Tuna, Salmon, Swordfish and Shark—Done, moist and flaky 140° F.;
Lobster Tail—Done, moist and tender 170° F.;
Lobster Claws—Done, moist and tender 180° F.

Accordingly, various embodiments can be applied to the cooking (or thawing and cooking) of different types of meat, for example, beef, veal, pork, mutton, lamb or poultry. Cooked temperatures for the various meats or fish may be set as desired or needed, such as based on typical minimum cooked temperatures. In embodiments, user interfaces will allow a user to set a desired doneness temperature. This can be particularly useful, for example, in settings where a cooked product is being prepared for later additional cooking, such as on an indoor or outdoor grill or under a broiler.

In embodiments, heat treatment of a food product may be maintained for an extended time period without overcooking and without burning the outside surface of the food product, or even with little or no cooking (e.g., in the case of dry aging of meat).

Thus, in operation, while often not necessary, heat treatment may be performed for a longer time period than in a conventional oven (e.g., up to 300% or more longer for cookies and up to four or more times longer for meat) without substantial degradation of the desirable characteristics of the food product. Thus strict compliance with recipe times for food products need not be maintained, allowing, for example, baking of different sized products or different content products together in the same oven without burning any of the products in the oven, and eliminating the need for careful monitoring of the food product (which elimination as described above may actually shorten the required cooking time). The heat treatment time may be the normal cooking or baking time (such as recommend by a recipe) or longer if desired. A longer heat treatment time may be used, for example, when it is desirable to keep meat at a desired edge to edge doneness, either for precooking, for keeping the meat warm without increasing doneness while portions but not all of it are served, or for keeping the meat warm without increasing doneness until it is convenient to serve it (e.g., cooking for an entire workday and having the meat ready at the desired doneness at dinner time). (Similarly, stew, pot roast, and other food items can be cooked in a covered pot within the oven with a very long cooking time such as morning until dinner time.) As another example, a batch of steaks could be precooked to and held at a "rare" state in advance of the cook receiving an indication of the preferences of the consumer of each steak. When those preferences are received, the steaks could be quickly heated to other levels of doneness according to the individual preferences, or, for example, finished on a grill. However, even meat cooked for a shorter period of time (e.g., less than the time that would result in an edge to edge medium done beef roast), will have the selected level of doneness near the surface and a normal gradient of doneness toward the center (such as from medium near the surface to rare in the center).

Figure 5:
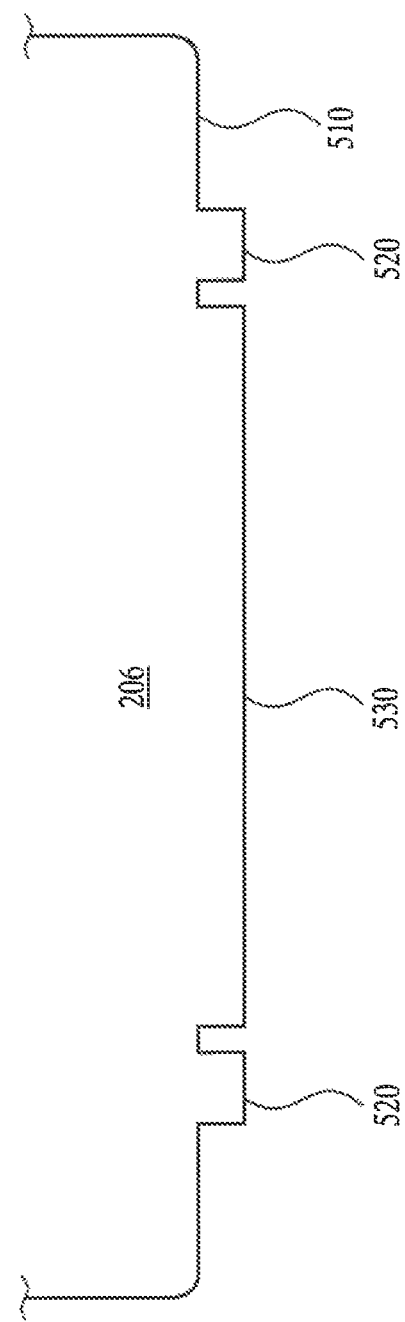
FIG. 5 is a cross-sectional view of the bottom wall of an embodiment of an oven with at least one indentation for holding water.

In some embodiments, particularly where a food product is normally heat treated for an extended period of time, water may be placed in the oven, but not in contact with the food product, to prevent or reduce drying out of the food product, for proofing, and/or to expedite cooking. For example, the oven may include or contain a structure (e.g., a pan or container, or an optional indented surface such as annular indentation 520 and/or central indentation 530 in the oven bottom wall 510 as seen in cross section in FIG. 5) that holds water and allows the water to evaporate. This will raise humidity in the oven to prevent drying and/or for proofing, and will also allow the vapor to contact the food product in the air within the oven, optionally at or above boiling temperatures as superheated steam. As noted above, this may shorten the required cooking time for various food products.

In embodiments, the temperature of the heating element may be controlled using the sensed surface temperature of the heating element. That surface temperature may be sensed by a temperature sensor that is operatively coupled to a surface of the heating element (e.g., in contact directly or through a thermal contact device such as a metal clamp or strap with, or remote but focused on, one or more portion of the heating element). In embodiments, the sensed temperature may be a sensed internal temperature of the heating element that may be acquired by integrating a portion of the temperature sensor into the heating element (e.g., a sensing tip embedded within the heating element). Output from the temperature sensor may be provided as input to a controller that limits or turns off the energy delivered to the heating element to heat it.

In embodiments, one or more air temperature sensor may also be provided in an oven. Output from the air temperature sensor(s) may be provided as input to the controller to control the temperature of the heating element(s) when the limiting function is disabled, for example during fast preheating or during use of the oven as a normal oven without the above-described temperature control in effect. This may be desirable for some users and some heat treating operations, such as broiling or high-temperature roasting as well as for fast preheating.

In embodiments, the heating element is continuously or intermittently energized to keep the heating element at or near the set temperature. For example, once heated, the controller can maintain energization of the heating element to keep its temperature within no more than a few degrees (e.g., ±5° F. or 2° F. or less) below the temperature limit, and to bring the heating element temperature back up to that range if it is cooled during the heat treatment (e.g., by opening of the oven door or insertion of a cold food product by a user). In embodiments, the controller applies intermittent thermostatic energization of the heating element, such as with a time delay to avoid chattering.

Various embodiments include an oven 100, such as illustrated in FIG. 1 for heat treating food products. The oven 100 may for example be a general purpose domestic oven (e.g., natural or forced air convection home kitchen range, countertop or wall oven) or a general purpose commercial oven (e.g., a commercial bakery or restaurant general purpose oven), self-cleaning or non-self-cleaning. As used herein, "general purpose oven" signifies an oven that is capable of, for example, warming, baking, roasting and broiling. Alternatively, the oven may be a special purpose commercial oven. For example, some special purpose high volume baking ovens include a rotating rack upon which pastry products are placed for baking. Such an oven includes a mechanism for rotating the rack to ensure even browning of the products. By incorporating the temperature control features disclosed herein into such an oven, the need for such a rotation mechanism could be eliminated.

The oven 100 in embodiments is configured to implement one or more methods disclosed herein. In the embodiment of FIG. 1, the oven 100 includes an insulated housing 102 (e.g., double wall insulated housing) defining an interior space in which a food product 104 (e.g., pastry products, meat or fish) is placed to be heat treated. The oven 100 may be controlled in accordance with various method embodiments described herein.

Figure 2:
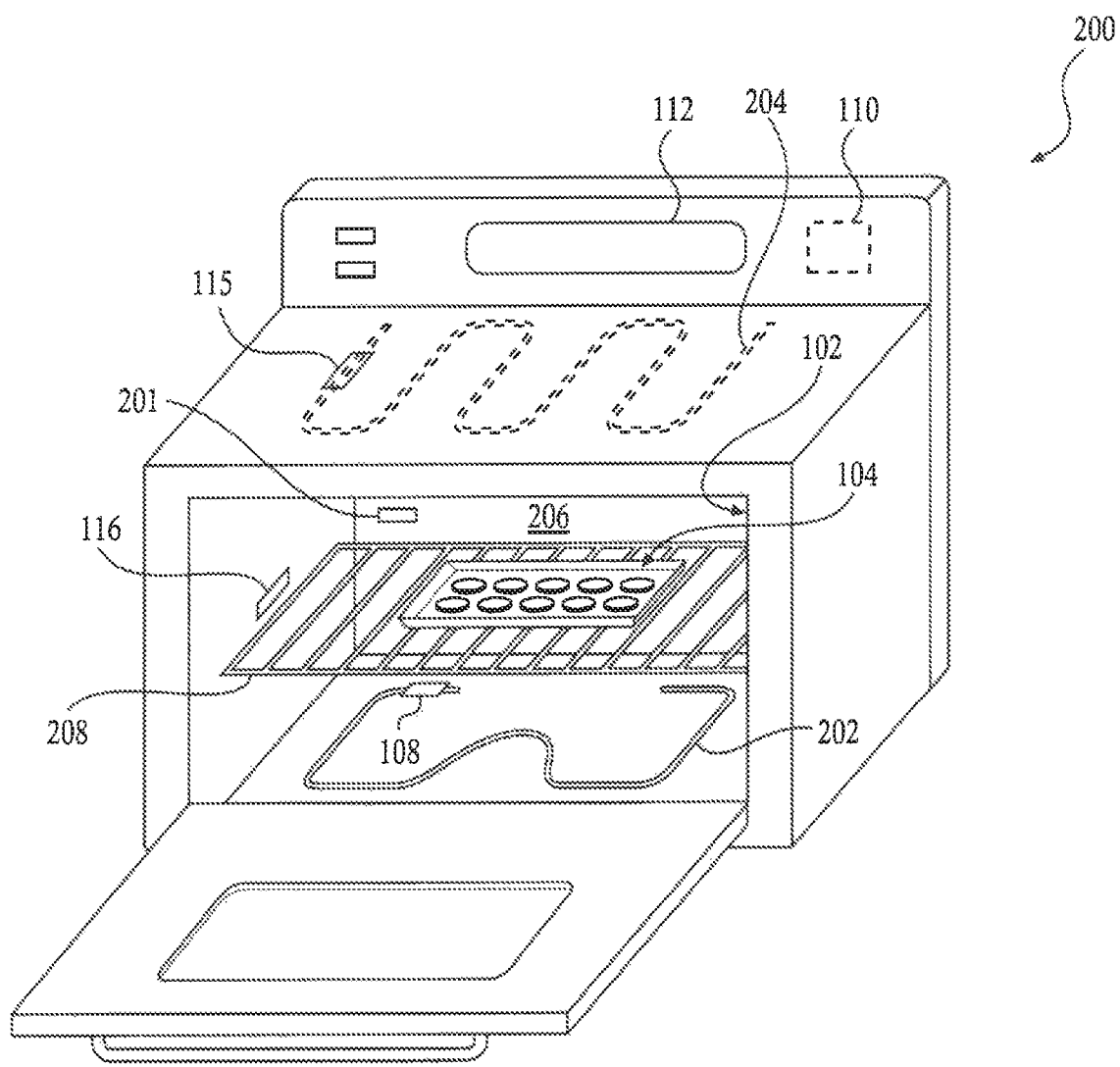
FIG. 2 is a perspective view of a range in accordance with an embodiment.
Figure 6:
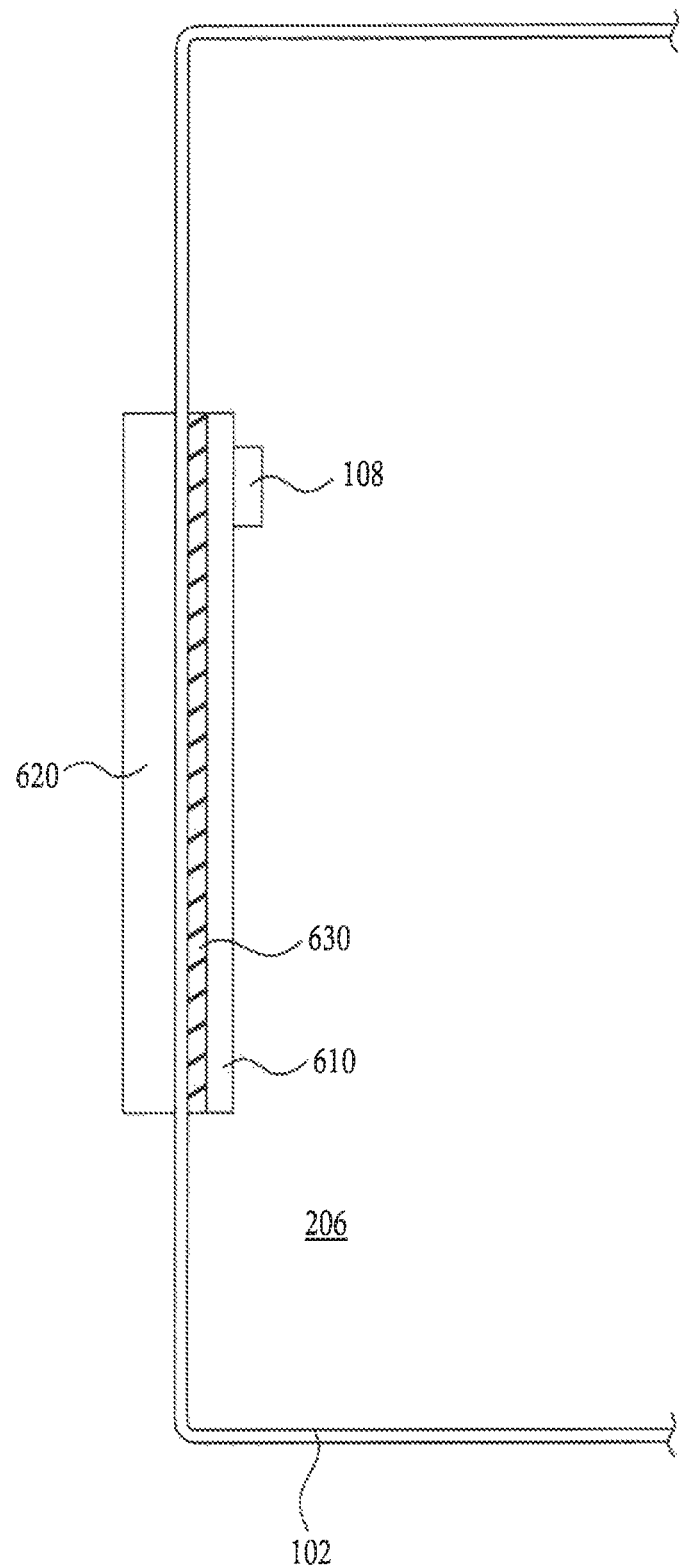
FIG. 6 is a cross-sectional view of a portion of an oven wall in an embodiment with an induction heating unit.
Figure 7:
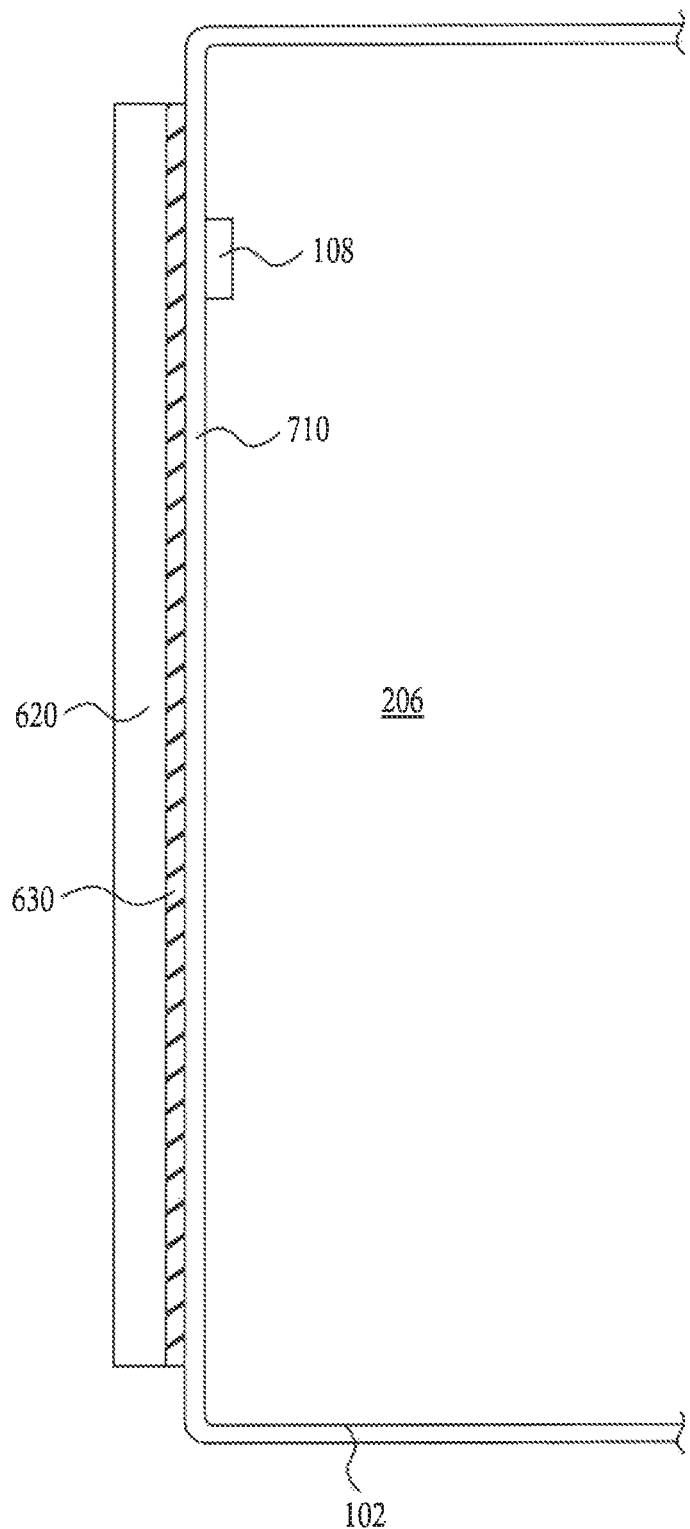
FIG. 7 is a cross-sectional view of a portion of an oven wall in an alternative embodiment with an induction heating unit.
Figure 8:
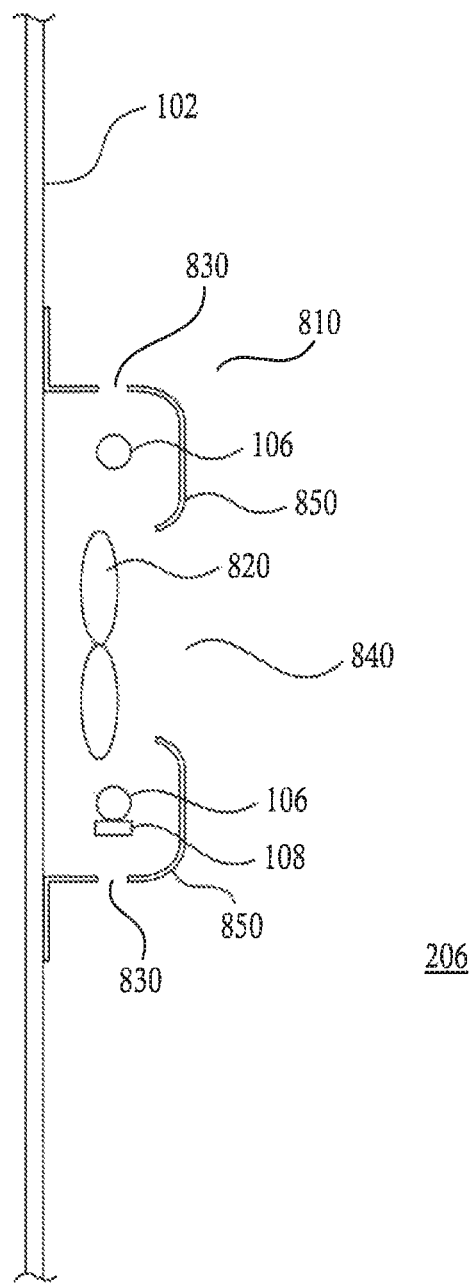
FIG. 8 is a cross-sectional view of a portion of an oven wall in an embodiment with a fan heater.
Figure 9:
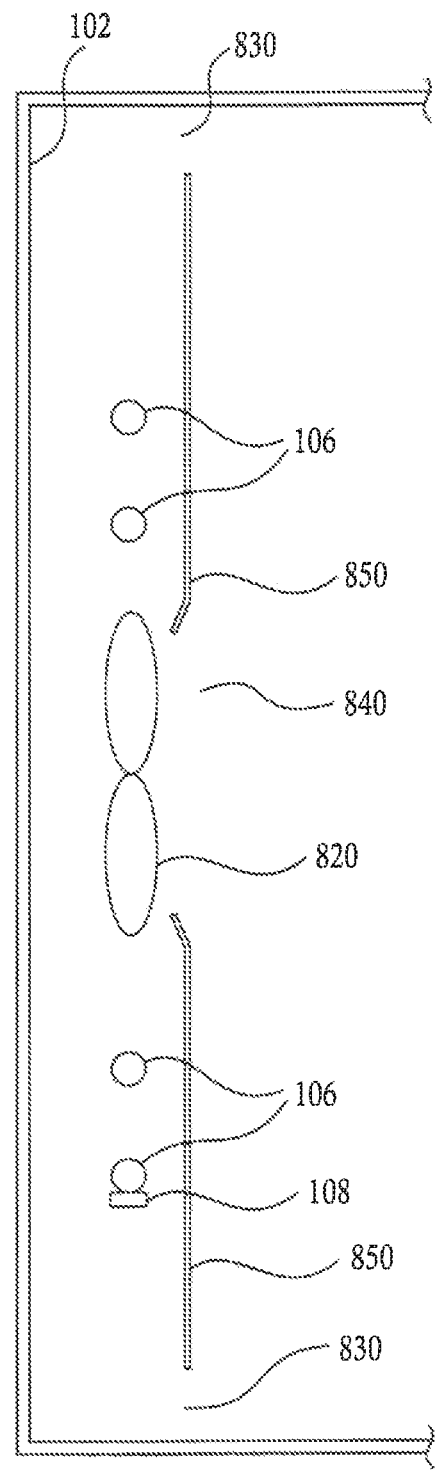
FIG. 9 is a cross-sectional view of a portion of an oven wall in an alternative embodiment with a fan heater.

With reference again to FIG. 1, the oven 100 includes within the housing 102 a first heating element 106 and a corresponding first temperature sensor 108. As shown in FIG. 2, the heating element(s) could be at the bottom of the oven as at lower heating element 202, the top of the oven as at upper heating element 204 (dotted lines being used here to show its location below the top surface of the oven), and/or at one or more sides of the oven. Any suitable electrically energizable heating elements may be used. For example, the electrically energizable heating element(s) may be a resistance-heating element such as a conventional sheathed nichrome heating element at one or more side, top and/or bottom wall of the oven. Alternatively, as shown in FIG. 6 and FIG. 7, the heating element(s) may be one or more induction heating element such as an induction plate 610 that may be within the cooking space 206, or an induction plate 710 that forms a top, bottom and/or side oven wall exposed to the cooking space 206. The induction plate may be associated with an induction coil 620 within a space above, below, beside or behind an interior wall of the oven housing 102. A thermal/dielectric insulator 630 keeps the induction coil 620 outside the cooking space 206 both electrically and thermally, so that the induction coil 620 only energizes (heats) the induction plate and the oven air in contact with it. (FIGS. 6 and 7 show such a system on a representative top, side or bottom wall of housing 102.) In embodiments, such as the alternative embodiments of FIGS. 8 and 9, a forced air convection system may include a fan heater 810 in which the first heating element 106 and first temperature sensor 108 are inside and/or outside the cooking space 206, and fan 820 blows air over heating element 106 and throughout the cooking space 206 by way of air passages 830 and 840 through baffle 850 to heat the food product. In embodiments, the bottom of the oven cooking space is free of heating elements, thereby allowing a water containment area such as annular indentation 520 or central indentation 530 (FIG. 5) and/or foil or the like drip protector to be located at the bottom of the oven without impairing the heating function.

In various embodiments, as discussed in more detail herein, first temperature sensor 108 is operatively coupled to one or more first heating element 106 to sense (e.g., measure or detect) a temperature of first heating element 106, such as by contact with a surface of first heating element 106. In some embodiments, temperature sensor 108 may measure or detect the temperature within first heating element 106, such as having a measurement or detection portion inside first heating element 106, as further discussed below.

The oven 100 of FIG. 1 further includes a controller 110 coupled to first heating element 106 to selectively limit a temperature of first heating element 106, for example in accordance with one or more of the above-described methods. For example, a feedback control arrangement may be provided as discussed herein, wherein the controller 110 adjusts a control signal to (e.g., voltage applied to) first heating element 106 to limit the temperature of first heating element 106 based on a set cooking (e.g., recipe) temperature and/or a set internal temperature of a food product to be heat treated, plus droop offset, as described above. In embodiments, the temperature of first heating element 106 is controlled based on feedback temperature information of a sensed temperature of a surface of first heating element 106 from temperature sensor 108.

With the temperature feedback information from temperature sensor 108, the heat treatment can be controlled by controlling a maximum temperature of first heating element 106 and maintaining first heating element 106 at or near that temperature. Embodiments include but are not limited to a close and sensitive on-off response to the sensor (e.g., with a 2° F. or less span) with a minimum time delay (e.g., 10 or 20 seconds) to prevent control chattering. Proportional and tuned controls may be used, but are often less reliable as they tend to be sensitive to ambient temperatures, which can be extreme in a kitchen.

Figure 4:
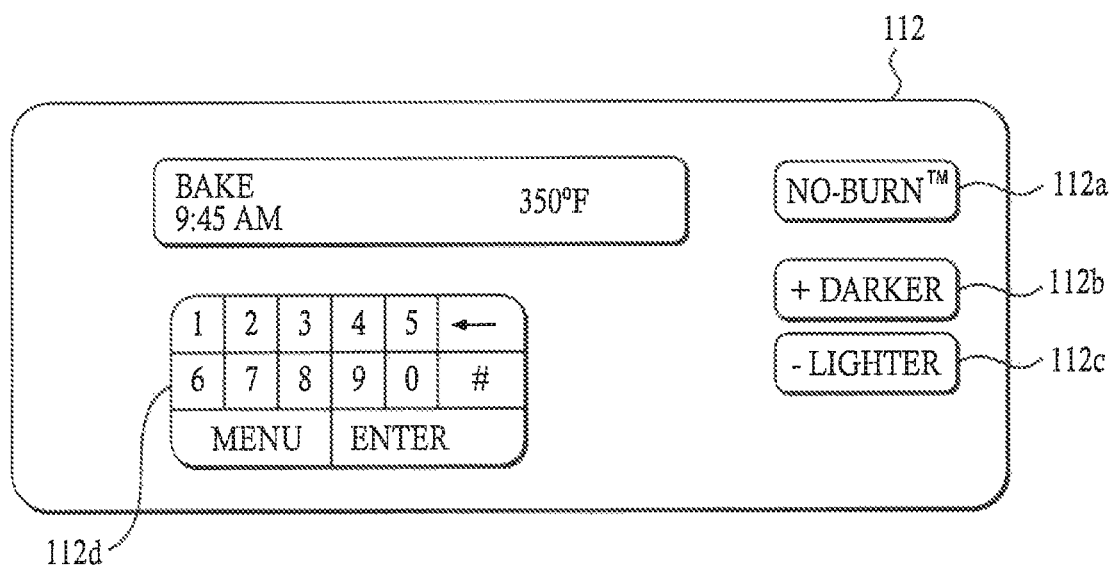
FIG. 4 is a diagram of a user interface in accordance with an embodiment.

The oven 100 further includes a user interface 112 coupled to the controller 110. The user interface 112 is configured to receive a user input, such as a desired level of doneness for a food product 104 as discussed herein. In some embodiments, the user interface 112, as shown in more detail in FIG. 4, may include a bake or "NO BURN™" interface that when activated by way of an input structure 112*a* (engaged by a user by, e.g., depressing a button, turning a dial, or touching a touch-sensitive pad), initiates one or more methods disclosed herein to heat treat the food product with the temperature of the heating element limited as described above. An indicator such as a "NO BURN™" light may be activated when the oven is operating according to a "safe" mode as described in more detail above. When de-activated (which may be manually or automatically performed, including, for example, by changing the settings of temperature and/or mode), the user activated imposition of an upper temperature limit may be canceled or removed. In some embodiments, this simplified interface results in an approximately 350° F. plus droop offset temperature of heating element 106, since very few foods will burn at their surface at or below this temperature. However, such an interface may be correlated to other temperatures such as those described above. The user interface 112 may include, in some embodiments, "plus" and "minus" or "darker" and "lighter" input structures 112*b* and 112*c* as described above (e.g., non-numerical controls that may be activated to adjust a level of doneness or brownness of the product per a recipe or the user's experience), which increases or decreases a controlled temperature to change the maximum temperature of the heating element (with or without displaying the adjusted temperature). Similarly, meat/fish "doneness" input structures may be provided as described above, for example by way of a button, dial or touchpad. These simplified systems are particularly useful in home ovens. In various embodiments, numerical controls 112*d* for adjusting the temperature as would conventionally be provided on an oven are also included. This may be useful in commercial ovens as well as home ovens.

In some embodiments, the oven 100 of FIG. 1 may optionally include one or more second heating element 114, for example upper heating element 204 in FIG. 2 that may be configured as a broiling heating element. For example, in some embodiments, the first heating element 106 may be configured to heat up to 500° F., while the second heating element 114 is configured to heat up to 800° F. or more. The second heating element(s) 114 in various embodiments may have an optional second temperature sensor 115 for use as described above, and/or may be used for preheating as discussed herein or for broiling, browning, and/or other heat treating, if desired. In some embodiments, preheating and/or other heat treatment may be accomplished by deactivating the heat treating control based on feedback temperature information from the heating element temperature sensor 108 and/or optional second temperature sensor 115. During such deactivation, feedback control may, if desired, be provided based on output from optional oven air temperature sensor 116.

As noted above, the oven 100 may optionally include an optional oven air temperature sensor 116 that senses the temperature of air in the cooking space 206 within the housing 102. Air temperature sensor 116 is not in contact with the first or second heating elements 106 and 114, but instead measures the temperature of air within the housing 102 as would be provided by conventional oven temperature sensing arrangements. For example, the temperature sensor 116 in various embodiments is operational when the "NO BURN™" feature is not operating and the oven 100 is operating in a conventional operating mode, such as to cook a roast conventionally in the oven 100 or during preheating.

The various components and elements of the oven 100 may be positioned and arranged as desired or needed, such as based on the configuration or cooking requirements for an oven. For example, FIG. 2 illustrates a range 200, which may include the oven 100.

In the range 200, range top cooking burners or "eyes" are not illustrated, but could be provided on a top surface of the range 200. In the illustrated embodiment (and with reference also to FIG. 1), the range 200 in various embodiments comprises a minimally vented oven that has small vents or relies on the door to be an outside vent from preferably insulated housing 102 or has one or more optionally closable vents 201, such as are often provided in self-cleaning ovens when the door is locked. A lower heating element 202 is located at a bottom portion of the range 200 in the air space 206, and is configured as the first heating element 106, and upper heating element 204 (shown in phantom lines) may be located at, or near but spaced apart from, a top portion of the oven of range 200 and configured as the second heating element 114. In some embodiments, different configurations of the range 200 may be provided or the various embodiments may be implemented in different ovens.

A stationary but preferably removable rack or racks 208 may be positioned within the oven of range 200, and may be movable to different heights.

In the embodiment of FIG. 2, the temperature sensor 108 is attached to a surface of the lower heating element 202 to sense (e.g., measure or detect) the temperature of the lower heating element 202.

Figure 3:
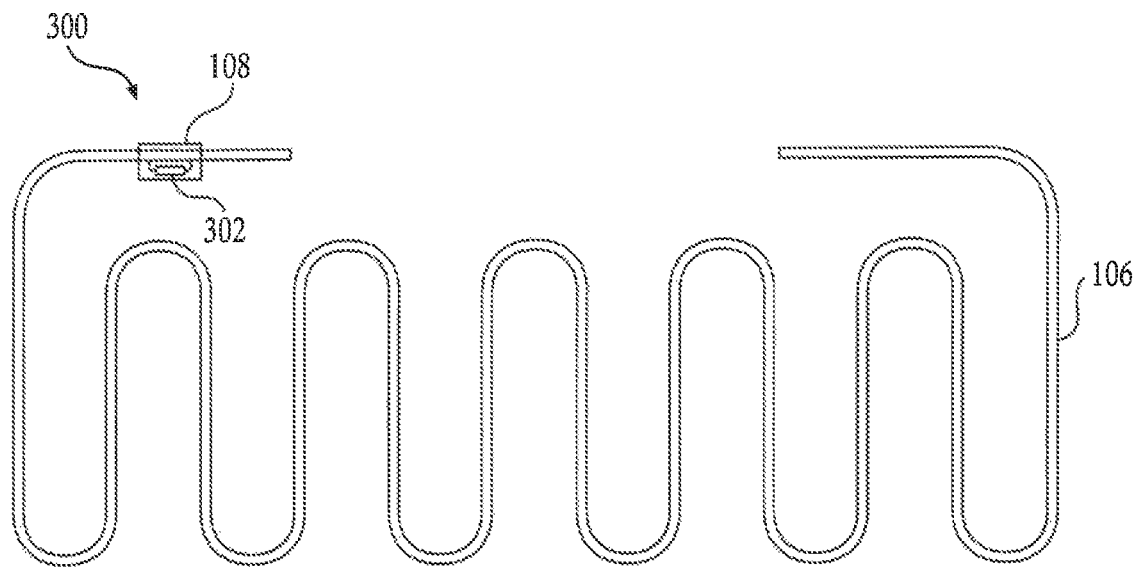
FIG. 3 is a diagram of a heating element and a temperature sensor in accordance with an embodiment.

In the embodiment of FIG. 3, temperature sensor 108 is attached to a surface of an end portion 300 of a heating element 106. However, it should be appreciated that the temperature sensor 108 may be located at a different portion of the heating element 106/114. Also, additional temperature sensors 108 may be coupled to the heating element 106, such as at different spaced apart locations along the surface of the heating element 106. The number and location of the heating elements may be provided based on, for example, the configuration, including the size, of the oven cooking space 206 (shown in FIG. 2).

Optionally, one or more temperature sensor 115 could also, or alternatively, be operatively associated with the upper heating element 204 to sense its temperature and provide input to the controller 110 as shown in FIGS. 1 and 2. In such embodiments, the system could operate as discussed herein vis-à-vis the first heating element 106. Due to its location at the top of the oven, it may be acceptable to operate the optional upper heating element 204 at a higher or lower temperature (e.g., up to 10-15° F.) than the temperature of the lower heating element 202. Hotter is particularly useful in vented ovens, whereas cooler is particularly useful for, e.g., certain poultry products and cookies. For example, turkeys (and most poultry) require lower cooked temperature of the white meat while browning the skin and higher temperature of the dark meat for it to be fully cooked. When cooking whole poultry in an embodiment of an oven with the described control on upper and lower heating elements, one may set a lower temperature for the upper heating element 204 than for the lower heating element 202, and cook the turkey with the breast up direct to done juicy tender white and dark meat and nicely browned skin. Turkey also benefits from making the oven minimally-vented or relying on the door to move to vent extra air and steam when water is placed in the oven and superheated steam cooks the turkey. This results in turkeys cooking much faster. Cookies may also be baked much more conveniently and consistently with an upper heating element temperature and higher lower heating element temperature controlled in accordance with methods described herein. In a conventional oven, the cookie bottom is browned by the pan and the temperature of the oven, and cooking of the cookie top is stopped in time for the cookies to have the appearance and texture of an oven 25° F. lower in temperature. The oven temperature, cookie size and timing all have to be just right. With the herein-described oven control, preferably with venting, cookies of any size can be baked to perfection and with significant timing forgiveness, and with no surface burning.

The temperature sensors 108 and 115 may be any suitable sensor, such as a thermistor, a thermocouple, or a resistance temperature detector (RTD), such as a platinum RTD including platinum thin film or wire coils. An RTD operates by supplying a constant current and measuring a resulting voltage drop across a resistor 302 (FIG. 3), which can then be used to determine a resistance value used to determine temperature using techniques known in the art. As should be appreciated, different types of temperature sensing devices may be used. For example, the temperature sensors 108 and 115 may be the same or different, and may be any type of temperature sensing device that is robust enough for the oven environment. Thus, for example, a very robust (or remote) temperature sensor should be used in a self-cleaning oven that reaches very high temperatures such as 900° F. or more. In some embodiments, the temperature sensor may be a remote temperature sensor that focuses on the heating element (e.g., an infrared detector focused on the heating element). This can permit the temperature sensor to be protected from the more extreme temperature portions of the oven.

The shape and size of the first heating element 106 and the second heating element 114 may be selected as desired or needed. Thus, the shape of these elements in the figures is merely for illustration. For example, in some embodiments as shown for example in the lower heating element 202 of FIG. 2, a minimum surface area of the first heating element 106 is selected to minimize the cost of the heating element. The surface area may be selected based on the heating requirements, the configuration of the oven, and/or other factors. The larger the surface area of the first heating element, the more energy can be transferred to the oven and the faster the food product will be heated. As the product cooks, the energy required to keep the cooking process going diminishes dramatically. Using a conventional heating element, generally selected for least cost by the manufacturer, will work passably well, especially with preheating as described above. When a larger surface area heating element is used, the oven is likely to be faster even than a conventional oven counterpart in which the heating element turns red hot when energized.

In some embodiments, the first heating element 106 is substantially larger, for example, 50% to 100% more surface area or more, than a conventional heating element. In some embodiments, the first heating element 106 is sized to cover or encompass substantially all of a top, bottom and/or side wall of the oven 200. For example, a larger surface area resistance heating element as shown for the upper heating element 204 of FIG. 2 or the heating element 106 of FIG. 3 may have turns spaced apart by 4 inches or less substantially all the way across a bottom, side and/or top wall of the oven cooking space 206. With, for example, an induction heating system, a large surface-area induction plate in the oven or formed as one or more oven interior top, bottom and/or side walls could be the first heating element 106, as illustrated in FIGS. 6 and 7.

One or more embodiments can comprise one or more microprocessors (which may be embodied as a processor) and a memory, coupled via a system bus, which may be embodied as or form part of the controller 110 shown in FIG. 1. The microprocessor can be provided by a general purpose microprocessor or by a specialized microprocessor (e.g., an ASIC). In embodiments, the controller 110 can comprise a single microprocessor which can be referred to as a central processing unit (CPU). In other embodiments, the controller 110 can comprise two or more microprocessors, for example, a CPU providing some or most of the functionality and a specialized microprocessor performing some specific functionality. A skilled artisan would appreciate the fact that other schemes of processing tasks distributed among two or more microprocessors are within the scope of this disclosure. The memory can comprise one or more types of memory, including but not limited to: random-access-memory (RAM), non-volatile RAM (NVRAM), etc.

Block diagrams in the figures illustrate the architecture, functionality, and operation of possible implementations of systems and methods according to various embodiments of the present disclosure. In them, each block may represent a module, segment, or portion of code, which comprises one or more executable instructions for implementing the specified logical function(s). Each block, and combinations of blocks, can be implemented by special purpose hardware-based systems that perform the specified functions, or combinations of special purpose hardware and computer instructions.

At least some of the present disclosure is described herein with reference to methods and components that can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified herein.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions specified herein. When implemented in one or more embodiments, this results in a transforming or converting a general purpose computer/processor/hardware to a specialized computer/processor/hardware that improves the technological art.

A very simple control plus a manual and a thoughtful cook is all that is needed to implement almost all the features of this technology in even a domestic oven.

The description of the present disclosure has been presented for purposes of illustration and description, but is not intended to be exhaustive or limited to embodiments in the form disclosed. Many modifications and variations will be apparent to those of ordinary skill in the art without departing from the scope and spirit of the invention. The embodiments were chosen and described in order to explain the principles of embodiments and practical application, and to enable others of ordinary skill in the art to understand embodiments with various modifications as are suited to the particular use contemplated.

What is claimed is:

1. An oven, comprising:
   a housing defining an interior cooking space;
   an electrically energizable heating element exposed to air that is in or enters the interior cooking space and configured to heat that air;
   a temperature sensor configured to sense a temperature of the heating element; and
   a controller configured to impose an upper limit on the temperature of the heating element and respond to output from the temperature sensor such that the heating element temperature does not exceed the upper limit while the oven heat treats a food product primarily by thermal transfer of heat from the air heated by the heating element to the food product by natural or forced air convection;
   wherein the controller is configured to set the upper limit of the temperature of the heating element to be a set cooking temperature and/or a set internal doneness temperature of a food product to be heat treated, plus a predetermined droop offset of the oven that is an inherent loss of heat energy involved in the transfer of heat from the heating element to and through the air and is characteristic of the oven.

2. The oven of claim 1, further comprising a user interface that comprises an activation input structure by which a user can activate imposition of the upper limit by the controller.

3. The oven of claim 2, wherein the user interface comprises a deactivation input structure by which imposition of the upper limit by the controller can be deactivated.

4. The oven of claim 3, wherein the activation input structure and the deactivation input structure are a same on-off structure.

5. The oven of claim 1, further comprising a user interface that comprises numerical controls for adjusting the set cooking temperature and/or set internal doneness temperature.

6. The oven of claim 1, further comprising a user interface that comprises a labeled control for adjusting the set cooking temperature and/or set internal doneness temperature to a pre-set temperature.

7. The oven of claim 1, wherein the set cooking temperature does not exceed 425° F., the set internal doneness temperature does not exceed 180° F., and the droop offset does not exceed 30° F.

8. The oven of claim 3, wherein the user interface is configured to be operated by a user to deactivate imposition of the upper limit by the controller throughout preheating of the oven.

9. The oven of claim 1, wherein the controller is configured to automatically deactivate imposition of the upper limit throughout preheating of air in the oven.

10. The oven of claim 1, further comprising a second temperature sensor configured to sense temperature of air in the cooking space and provide input to the controller.

11. The oven of claim 1, further comprising a limit-input user interface comprising a first input structure configured to allow a user to set the upper limit.

12. The oven of claim 11, wherein the limit-input user interface further comprises a second input structure configured to allow a user to increase the upper limit by a predetermined amount, and a third input structure configured to allow a user to decrease the upper limit by a predetermined amount.

13. The oven of claim 1, further comprising a user interface configured to automatically set the upper temperature limit at about 350° F. plus a predetermined droop offset of the oven that is an inherent loss of heat energy involved in the transfer of heat from the heating element to and through the air and is characteristic of the oven, when actuated by a user.

14. The oven of claim 1, wherein the temperature sensor is in contact with a surface of the heating element.

15. The oven of claim 1, which is a general purpose oven.

16. The oven of claim 1, wherein the heating element is part of a fan heater.

17. The oven of claim 1, wherein the oven is free of heating elements at a bottom of the oven.

18. The oven of claim 1, wherein the heating element comprises a resistance heating element.

19. The oven of claim 1, wherein the heating element comprises an induction heating element.

* * * * *